United States Patent
Vijayanathan et al.

(10) Patent No.: US 12,432,262 B2
(45) Date of Patent: Sep. 30, 2025

(54) SYSTEMS AND METHODS FOR PREDICTING USER EXPERIENCES DURING DIGITAL CONTENT SYSTEM SESSIONS

(71) Applicant: Netflix, Inc., Los Gatos, CA (US)

(72) Inventors: Prasanna Vijayanathan, Sunnyvale, CA (US); Alexander Christian Pavlakis, New York City, NY (US); Andrew David Eichacker, Overland Park, KS (US)

(73) Assignee: Netflix, Inc., Los Gatos, CA (US)

( * ) Notice: Subject to any disclaimer, the term of this patent is extended or adjusted under 35 U.S.C. 154(b) by 138 days.

(21) Appl. No.: 18/525,486

(22) Filed: Nov. 30, 2023

(65) Prior Publication Data
US 2025/0184372 A1    Jun. 5, 2025

(51) Int. Cl.
*H04L 65/1066*    (2022.01)
*H04L 65/80*    (2022.01)

(52) U.S. Cl.
CPC .......... *H04L 65/1066* (2013.01); *H04L 65/80* (2013.01)

(58) Field of Classification Search
CPC ............................ H04L 65/1066; H04L 65/80
USPC ............................................................. 725/14
See application file for complete search history.

(56) References Cited

U.S. PATENT DOCUMENTS

| | | | |
|---|---|---|---|
| 2016/0140623 A1* | 5/2016 | Gupta | G06Q 30/0204 705/14.66 |
| 2022/0405603 A1 | 12/2022 | Manchanda | |
| 2023/0362420 A1 | 11/2023 | Mang | |
| 2024/0364581 A1* | 10/2024 | Pannu | H04L 41/0677 |

OTHER PUBLICATIONS

International Search Report and Written Opinion for International PCT Application No. PCT/US2024/057775, mailed Mar. 25, 2025; 13 pages.
Wehner et al., "Explainable Data-Driven QoE Modelling with XAI", 2023 IEEE Explore; 9 pages.

* cited by examiner

*Primary Examiner* — Adil Ocak
(74) *Attorney, Agent, or Firm* — Greenberg Traurig, LLP

(57) ABSTRACT

The disclosed computer-implemented methods and systems leverage machine learning techniques to generate disruption and delight predictions associated with digital media sessions. For example, the methods and systems discussed herein generate input features for a deep neural network that represent various characteristics associated with a session. By applying the deep neural network to the generated input features, the methods and systems described herein generate accurate disruption and delight predictions in addition to an attribution report detailing which of the characteristics represented among the input features had the greatest impact on the generated predictions. Various other methods, systems, and computer-readable media are also disclosed.

20 Claims, 4 Drawing Sheets

SYSTEMS AND METHODS FOR PREDICTING USER EXPERIENCES DURING DIGITAL CONTENT SYSTEM SESSIONS

CROSS-REFERENCE

This application is related to U.S. application Ser. No. 18/524,197 entitled "SYSTEMS AND METHODS FOR PREDICTING DISRUPTIONS IN DIGITAL CONTENT SYSTEMS SESSIONS", filed Nov. 30, 2023, the disclosure of which is incorporated, in its entirety, by this reference.

BACKGROUND

Streaming digital content is a very common and popular form of entertainment. For example, most digital content streaming platforms make client-based applications available for users to install on their client devices. Users then select and play digital media via these applications. In this way, users interact with digital media on their smartphones, tablet computers, laptops, or even via set-top devices and smart TVs.

Despite the popularity of streaming digital media, it is often extremely difficult to understand streaming application experiences at a user level. To illustrate, in one example a new feature is rolled out to a digital content system application that causes the frequency of digital content system application crashes to increase. In this example, indicators of user satisfaction also increase-despite application crashes typically being a significant pain-point for users. Making determinations as to why users either liked or disliked the new feature rolled out to the digital content system application based on metrics like number of crashes, and minutes of qualified digital media item playback is often very inaccurate. Moreover, current analytical efforts generally consume vast amounts of resources-both in terms of computational resources and man-hours—to leverage brute force analytical techniques in trying to make sense of what seem to be contradictory findings.

SUMMARY

As will be described in greater detail below, the present disclosure describes implementations that predict a user's experience during a digital content system session and determines root causes of the user's experience. For example, implementations include generating a device-specific feature, a geographic feature, and an application-level feature associated with a session between a client device and a digital content system, applying a multiclass prediction deep neural network to the device-specific feature, the geographic feature, and the application-level feature to generate a disruption prediction for the session and a delight prediction for the session, determining contribution levels of the device-specific feature, the geographic feature, and the application-level feature to the disruption prediction, determining contribution levels of the device-specific feature, the geographic feature, and the application-level feature to the delight prediction, and generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

Some implementations further include generating the device-specific feature by determining device characteristics of the client device and a digital content system account identifier associated with the client device, and generating the device-specific feature based on the device characteristics of the client device and the digital content system account identifier associated with the client device. Additionally, some implementations also include generating the geographic feature by determining geographic characteristics associated with the client device and geographic characteristics associated with the session between the client device and the digital content system, and generating the geographic feature based on the geographic characteristics associated with the client device and the geographic characteristics associated with the session between the client device and the digital content system. Moreover, some implementations further include generating the application-level feature by determining application characteristics associated with a digital content system application installed on the client device, and generating the application-level feature based on the application characteristics.

In some implementations, the disruption prediction is binary, and the delight prediction is binary. Additionally, in some implementations, determining the contribution levels of the device-specific feature, the geographic feature, and the application-level feature to the disruption prediction includes determining positive contribution levels and negative contribution levels for the device-specific feature, the geographic feature, and the application-level feature relative to the disruption prediction for the session. For example, in some implementations, a positive contribution level indicates that an associated feature contributed to a favorable disruption prediction, and a negative contribution level indicates that an associated feature contributed to an unfavorable disruption prediction.

Similarly, in some implementations, determining the contribution levels of the device-specific feature, the geographic feature, and the application-level feature to the delight prediction includes determining positive contribution levels and negative contribution levels for the device-specific feature, the geographic feature, and the application-level feature relative to the delight prediction for the session. For example, a positive contribution level indicates that an associated feature contributed to a favorable delight prediction, and a negative contribution level indicates that an associated feature contributed to an unfavorable delight prediction.

Moreover, some implementations further include tracking attribution reports specific to the user of the client device for a predetermined amount of time, and in response to determining a deviation in at least one of disruption predictions or delight predictions indicated by the attribution reports, automatically selecting one or more session features for a next session initiated between the client device and the digital content system.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including generating a device-specific feature, a geographic feature, and an application-level feature associated with a session between a client device and a digital content system, applying a multiclass prediction deep neural network to the device-specific feature, the geographic feature, and the application-level feature to generate a disruption prediction for the session and a delight prediction for the session, determining contribution levels of the device-specific feature, the geographic feature, and the application-level feature to the disruption prediction, determining contribution levels of the device-specific feature, the geographic feature, and the application-level feature to the delight prediction, and generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

In some examples, the above-described method is encoded as computer-readable instructions on a computer-readable medium. In one example, the computer-readable instructions, when executed by at least one processor of a computing device, cause the computing device to generate a device-specific feature, a geographic feature, and an application-level feature associated with a session between a client device and a digital content system, apply a multiclass prediction deep neural network to the device-specific feature, the geographic feature, and the application-level feature to generate a disruption prediction for the session and a delight prediction for the session, determine contribution levels of the device-specific feature, the geographic feature, and the application-level feature to the disruption prediction, determine contribution levels of the device-specific feature, the geographic feature, and the application-level feature to the delight prediction, and generate an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

In one or more examples, features from any of the implementations described herein are used in combination with one another in accordance with the general principles described herein. These and other implementations, features, and advantages will be more fully understood upon reading the following detailed description in conjunction with the accompanying drawings and claims.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
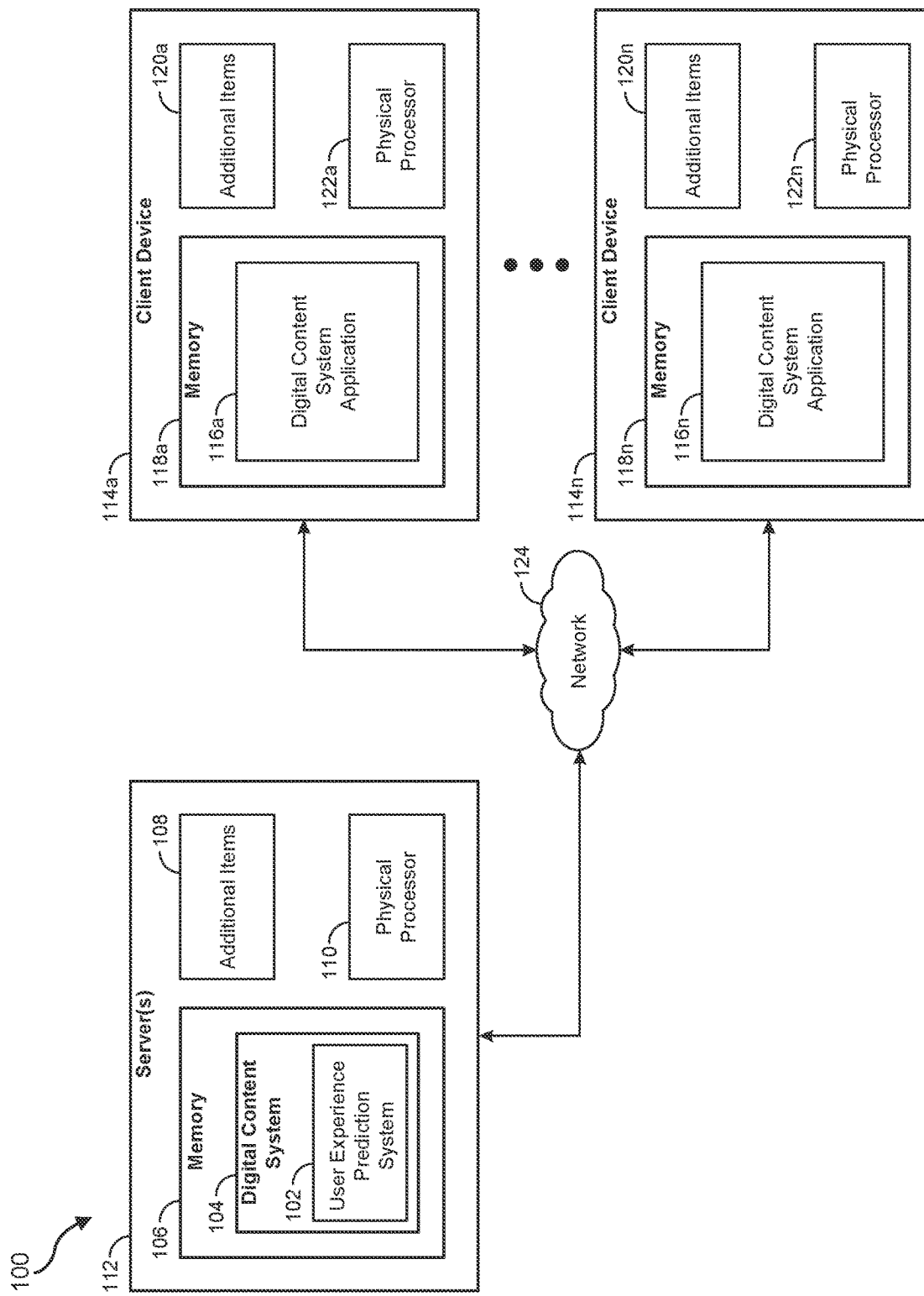
FIG. 1 is a block diagram of an exemplary environment for implementing a user experience prediction system in accordance with one or more implementations.

Throughout the drawings, identical reference characters and descriptions indicate similar, but not necessarily identical, elements. While the exemplary implementations described herein are susceptible to various modification and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As discussed above, determining whether a user's experience during a digital content system session was good or bad or some mix of both is often extremely difficult. This is typically due to the wide range of connectivity levels, client device capabilities, membership tiers, user expectations, etc. associated with each session. What may be a bad experience for one user during a digital content system session may not even register as problematic for another user. Similarly, a new feature rollout may improve the user experience for one user, even if the new feature causes some instability in the digital content system application on the user's client device. Once a user's experience is decoded, determining why the user's experience was good or bad is often even more difficult. This is particularly true when a digital content streaming system is widely distributed among vast ranges of users, regions, countries, etc.

Determining what type of experience a user had during a digital content system session and why are generally computationally intensive and inefficient tasks. For example, to determine why user satisfaction is increasing in a region where a new application feature has been rolled out that causes application instability (e.g., crashes, slow-downs), session-level data is collected across hundreds or even thousands of sessions and users. Specific and diverse metrics are then analyzed using brute force techniques to potentially illuminate what types of experiences users are having with the digital content system application. Determining root causes behind those experiences-good and bad-often requires even more data engineering. Reports are often manually configured and run multiple times until a picture develops of a session experiences and factors that led to experiences. Attempting to scale this process to larger numbers of sessions and users is often impossible because of the amount of data that must be analyzed across a wide and diverse range of users, connection levels, device types, and so forth.

As such, the present disclosure describes systems and methods that predict user experiences during digital content system sessions with a high level of accuracy and illuminate root causes behind those experiences. With this information, the systems and methods described herein take action to quickly and efficiently to solve digital content system session problems and/or to replicate features of delightful digital content system sessions. For example, the systems and methods described herein generate targeted, session-level input features based on client device characteristics, geographic characteristics of the sessions, and characteristics of the digital content system applications installed on the client devices used during those sessions. In one or more examples, the systems and methods further include applying a multiclass prediction deep neural network to the generated input features to generate both a disruption prediction and a delight prediction for individual sessions indicating whether or not disruptions and/or delights occurred during those sessions.

The systems and methods also include determining contribution levels of each of the input features that indicate how each feature contributed to the disruption predictions and the delight predictions. Thus, the disruption and delight prediction indicates whether disruptions and/or delights occurred during the session while the contribution levels point to root causes of those disruptions and/or delights. From this information, the systems and methods described herein further generate an attribution report that is used in some examples to automatically select features for future sessions that avoid disruptions and enhance viewing experiences.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
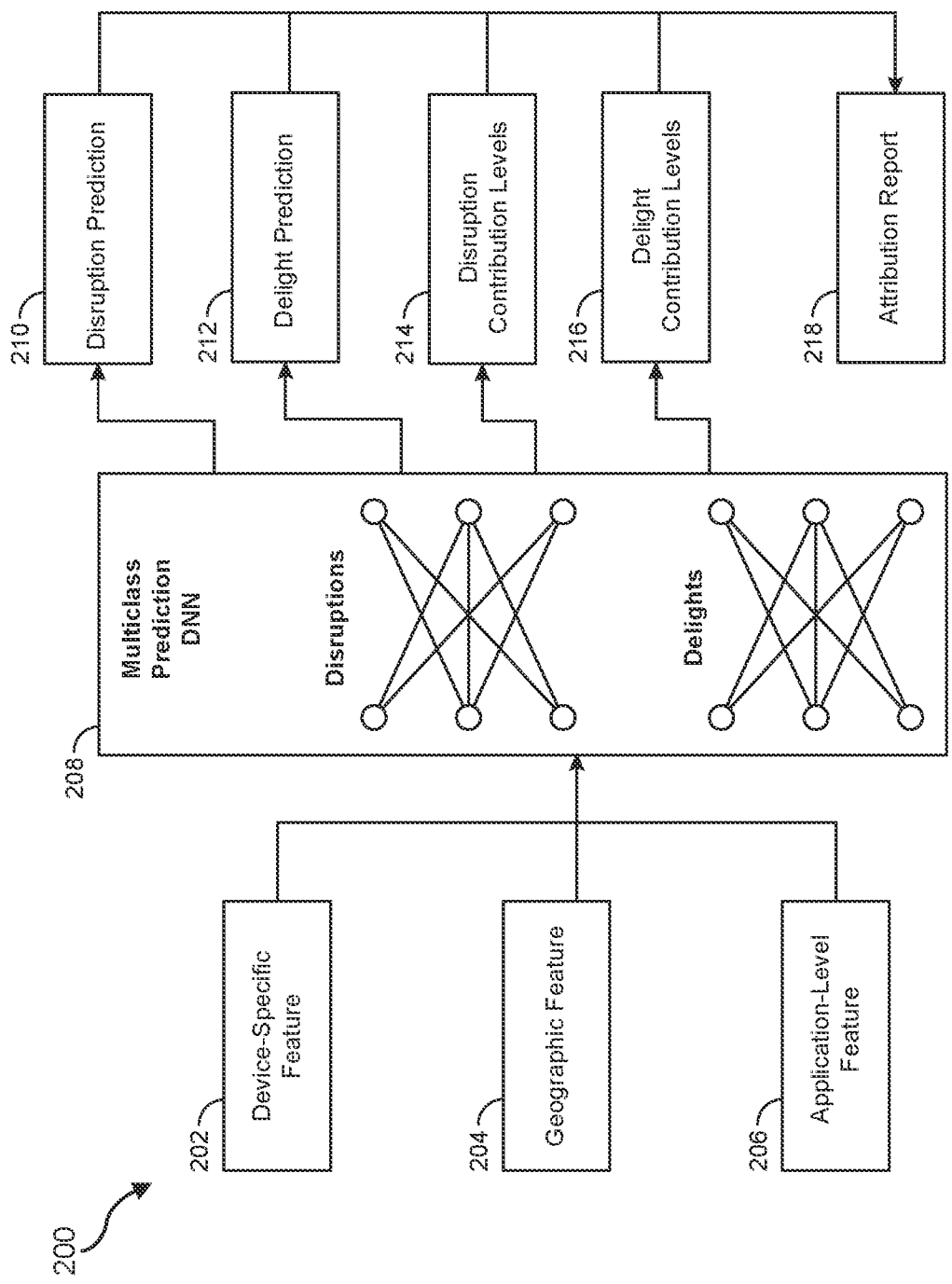
FIG. 2 illustrates steps taken by the user experience prediction system to predict whether a user experienced disruptions or delights during a digital content system session in accordance with one or more implementations.
Figure 3:
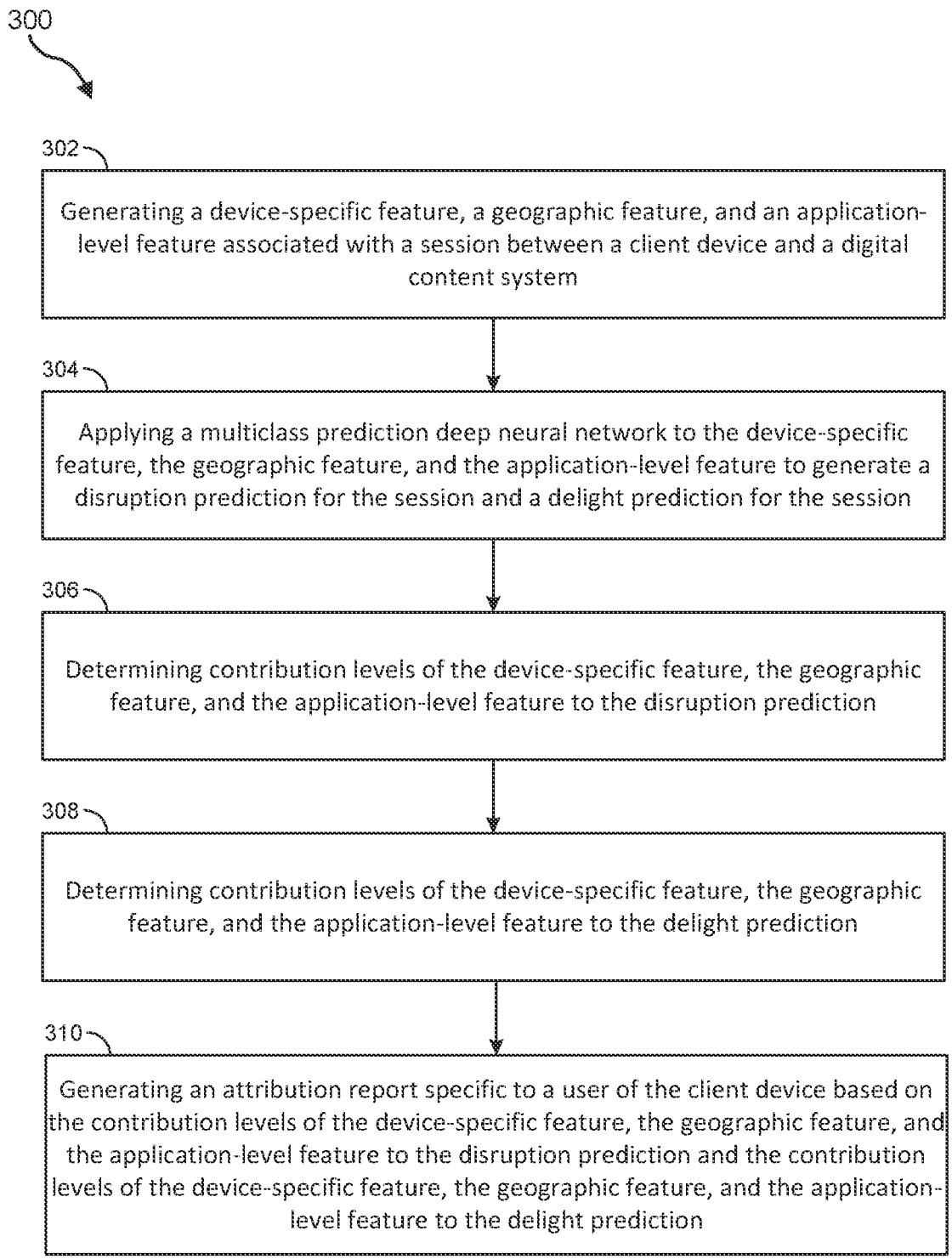
FIG. 3 is a flow diagram of an exemplary computer-implemented method for predicting user disruptions and delights during a digital content system session in accordance with one or more implementations.
Figure 4:
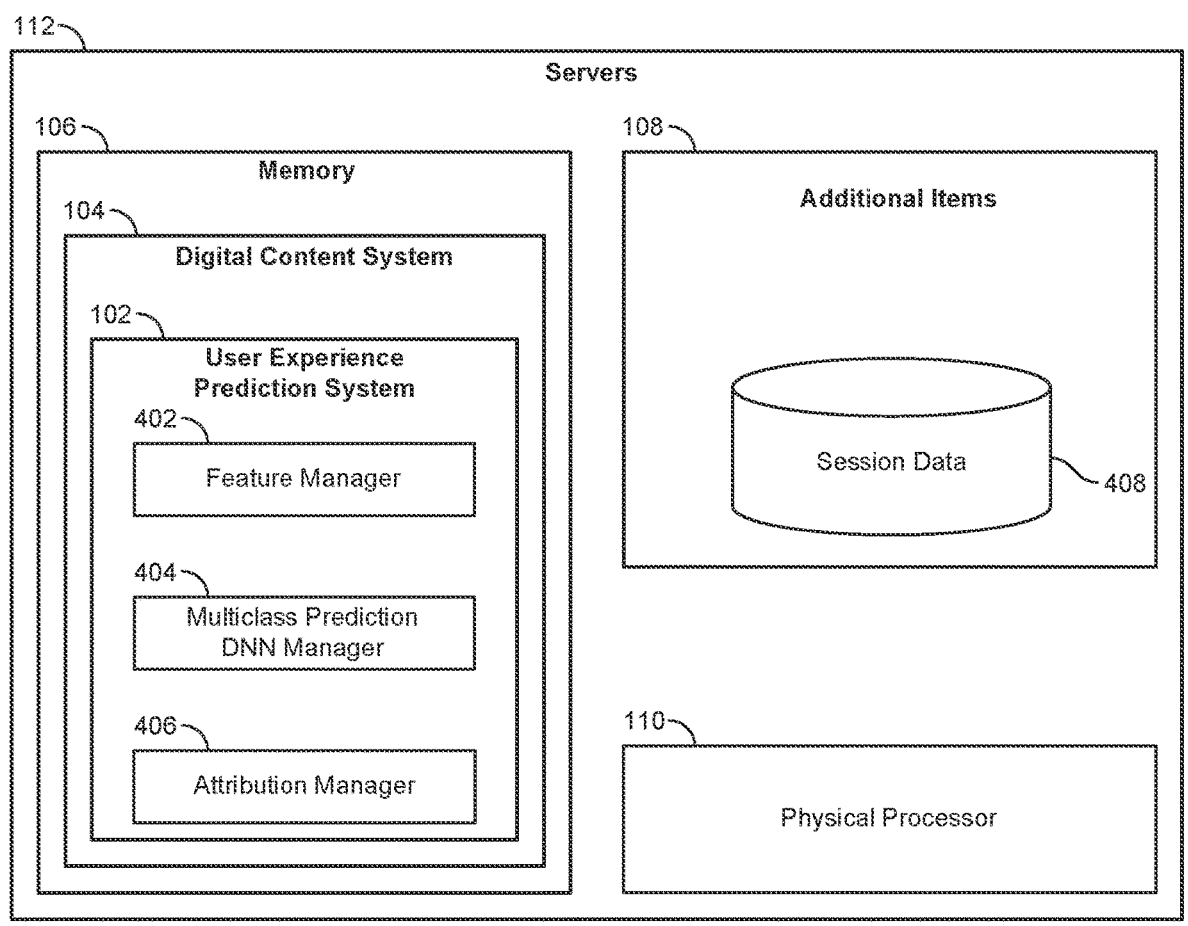
FIG. 4 is a detailed diagram of the user experience prediction system in accordance with one or more implementations.

The following will provide, with reference to FIGS. 1-4, detailed descriptions of a user experience prediction system that predicts disruptions and delights for a digital content system session and determines root causes behind those predicted disruptions and delights. For example, an exemplary network environment is illustrated in FIG. 1 to show the user experience prediction system operating in connection with one or more client devices where digital content system sessions occur. FIG. 2 illustrates the prediction pipeline utilized by the user experience prediction system, while FIG. 3 illustrates steps taken by the user experience prediction system in predicting disruptions and delights as well as corresponding root causes. Finally, FIG. 4 provides additional detail with regard to the features and functionality of the user experience prediction system.

As just mentioned, FIG. 1 illustrates an exemplary networking environment 100 implementing aspects of the present disclosure. For example, the networking environment 100 includes server(s) 112, client devices 114a-114n, and a network 124. As further shown, the server(s) 112 and the client devices 114a-114n include memories 106 and 118a-118n, additional items 108 and 120a-120n, and physical processors 110 and 122a-122n, respectively.

In one or more implementations, as shown in FIG. 1, the client devices 114a-114n are devices that are capable of digital content item playback. For example, in some implementations, the client devices 114a-114n are any of smartphones, tablets, laptop computers, desktop computers, smart wearables, virtual reality headsets, and so forth. In at least one implementation any of the client devices 114a-114n are set-top devices that receive streamed input from the server(s) 112 and provide the streamed content to a television for playback.

As further shown in FIG. 1, a user experience prediction system 102 is implemented as part of a digital content system 104 within the memory 106 on the server(s) 112. In one or more implementations, the digital content system 104 includes a subscription streaming service for providing digital media content to subscribers. In one or more examples, this digital media content includes non-interactive content such as movies and TV shows, as well as interactive content such as video games. Moreover, the digital content system 104 also provides static information such as menus and selectable thumbnails associated with digital media items.

As further shown in FIG. 1, the client devices 114a-114n include digital content system applications 116a-116n within the memories 118a-118n, respectively. In some implementations, the digital content system applications 116a-116n include some or all of the functionality of the user experience prediction system 102. In at least one implementation, the digital content system applications 116a-116n transmit session data to the user experience prediction system 102. For example, in one or more examples, the digital content system application 116a initiates a session with the digital content system 104 in response to one or more detected user selections. Once a session is initiated, the digital content system 104 establishes a communication channel with the digital content system application 116a. Utilizing this communication channel, the digital content system 104 provides streamed media content to the digital content system application 116a while the digital content system application 116a transmits session data back to the user experience prediction system 102. In some implementations, this session data is associated with a current session. In additional implementations, the session data is associated with past sessions, or both.

As mentioned above, the client devices 114a-114n are communicatively coupled with the server(s) 112 through the network 124. In one or more implementations, the network 124 represents any type or form of communication network, such as the Internet, and includes one or more physical connections, such as a LAN, and/or wireless connections, such as a WAN. In some implementations, the network 124 represents a telecommunications carrier network. In at least one implementation, the network 124 represents combinations of networks.

Although FIG. 1 illustrates components of the exemplary networking environment 100 in one arrangement, other arrangements are possible. For example, in one implementation, the user experience prediction system 102 operates as a native application installed on any of the client devices 114a-114n. In another implementation, the user experience prediction system 102 operates across multiple servers. In additional implementations, the exemplary networking environment 100 includes any number of client devices across any number of users, regions, geofenced areas, countries, and so forth.

In one or more implementations, and as will be explained in greater detail below, the methods and steps performed by the user experience prediction system 102 reference multiple terms. To illustrate, in one example, a "disruption" refers to an occurrence that interferes with a session. In some examples, a disruption is performance-based. To illustrate, a disruption may occur when the digital content system application on the client device crashes or freezes. In additional examples, a disruption is preference-based. For example, a disruption may occur when a digital media item plays at a lower resolution even though the client device user is subscribed to a membership tier that should provide digital media items at a higher resolution. In that example, the digital content system application may be playing the digital media item without any slow-downs or freezes—the resolution is just not what the user prefers.

A "delight" refers to an occurrence that enhances a session. In some examples, as with disruptions described above, delights are performance-based. To illustrate, a delight may occur during a session that includes a high number of qualified playback minutes (i.e., indicating that the digital content system application was stable such that the user could interact with and watch digital media items for quite a while). In additional examples, a delight is preference-based. For example, a delight may occur when a session includes playback of several digital media items all at a high resolution, which the user has indicated a preference for in their account settings.

As used herein, a "session" refers to a period of time during which the digital content system application on a client device is initialized and sending and receiving data to and from the digital content system 104. In some examples, a session includes digital media item browsing and streamed playback of a selected digital media item. In additional examples, a session includes streamed playback of more than one digital media item. Additionally, in some examples, a session includes streamed video game play.

As mentioned above, the user experience prediction system 102 generates predictions as to whether disruptions and/or delights occurred during one or more sessions and determines root causes associated with those predictions. FIG. 2 illustrates additional detail regarding the steps taken by the user experience prediction system 102 in a sequence 200 of generating disruption and delight predictions and attribution reports as to the root causes of those predictions. For example, as shown in FIG. 2, the user experience prediction system 102 generates input features including a device-specific feature 202, a geographic feature 204, and an application-level feature 206.

In one or more implementations, the user experience prediction system 102 generates the device-specific feature 202, the geographic feature 204 and the application-level feature 206 based on session-level data received from one or more client devices (e.g., the client devices 114a-114n). For example, in one or more implementations, the user experience prediction system 102 receives session data from the client device 114a (e.g., via the digital content system application 116a installed thereon) including information about the client device 114a and information about the digital content system application operating on the client device 114a.

In more detail, the user experience prediction system 102 receives data including or indicating device information associated with the client device 114a. For example, the user experience prediction system 102 receives device characteristics including a type of the client device 114a, an age of the client device 114a, a model of the client device 114a, a current power level of the client device 114a, processor architecture of the client device 114a, and a network connectivity status of the client device 114a. Additionally, in most examples, the user experience prediction system 102 also receives geographic information associated with the client device 114a including, but not limited to, GPS coordinates of the client device 114a, a current date and time associated with the client device 114a and/or the current session, a time zone associated with the client device 114a and/or the current session, a current region where the client device 114a and or the current session is located, and so forth.

Furthermore, the user experience prediction system 102 receives information about the digital content system application 116a installed on the client device 114a. For example, the user experience prediction system 102 receives information including a version or version number of the digital content system application 116a, an amount of time it takes the digital content system application 116a to load on the client device 114a, a digital content system account identifier associated with the digital content system application 116a, a total amount of viewing time (e.g., qualified or stable playback) and/or a total number of sessions that have occurred via the digital content system application 116a, an amount of delay the digital content system application 116a has experienced, a number of crashes the digital content system application 116a has experienced, playback logs generated by the digital content system application 116a, and error logs generated by the digital content system application 116a indicating types and numbers of errors experienced by the digital content system application 116a.

Additionally, in some implementations, information about the digital content system application 116a includes session-level information for sessions that have occurred on the client device 114a. For example, the user experience prediction system 102 receives session-level information such as a duration of one or more sessions, numbers of qualified plays (e.g., stable playbacks that did not crash), total viewing time for the sessions, session lengths, numbers of playbacks per session, numbers of sessions per day, and any logs (e.g., error logs) associated with the session.

In response to receiving all of this information, the user experience prediction system 102 generates the device-specific feature 202, the geographic feature 204, and the application-level feature 206. In one or more implementations, the user experience prediction system 102 generates the device-specific feature 202 as a representational vector reflecting device characteristics of the client device 114a. As such, in most examples, the device-specific feature 202 reflects any or all of the device characteristics discussed above. Similarly, the user experience prediction system 102 generates the geographic feature 204 as a representational vector reflecting geographic characteristics of the client device 114a, such as discussed above. Furthermore, the user experience prediction system 102 generates the application-level feature 206 as a representational vector reflecting the application characteristics of the digital content system application 116a, such as discussed above.

In one or more implementations, the user experience prediction system 102 applies a multiclass prediction deep learning network (DNN) 208 to the device-specific feature 202, the geographic feature 204, and the application-level feature 206. In one or more implementations, the multiclass prediction DNN 208 includes two or more binary classifier models that are trained to generate binary predictions within two or more classes. In the example shown, the multiclass prediction DNN 208 includes a binary classifier for disruption predictions and a binary classifier for delight predictions.

To illustrate, the user experience prediction system 102 trains the multiclass prediction DNN 208 to generate a disruption prediction 210 that is either "Yes" (e.g., there was a disruption in the session) or "No" (e.g., there was not a disruption in the session). Similarly, the user experience prediction system 102 trains the multiclass prediction DNN 208 to generate a delight prediction 212 that is either "Yes" (e.g., there was a delight during the session) or "No" (e.g., there were no delights during the session). In some implementations, the user experience prediction system 102 trains the multiclass prediction DNN 208 specifically for a single user account. In additional implementations, the user experience prediction system 102 trains the multiclass prediction DNN 208 in connection with a geographic region, or a group of users of the digital content system 104. In additional implementations, the multiclass prediction DNN 208 is any other type of machine learning model that can generate binary disruption predictions.

In one or more implementations, the user experience prediction system 102 augments the multiclass prediction DNN 208 with model explainability features. For example, in one implementation, the user experience prediction system 102 incorporates SHAP values ("Shapley Additive Explanations") into the multiclass prediction DNN 208. In that implementation, the user experience prediction system 102 applies SHAP methodology to determine how each of the device-specific feature 202, the geographic feature 204, and the application-level feature 206 contributed to each of the disruption prediction 210 and the delight prediction 212.

As such, along with the disruption prediction 210 and the delight prediction 212, the multiclass prediction DNN 208 also outputs disruption contribution levels 214 and delight contribution levels 216. In one or more implementations, the disruption contribution levels 214 indicate the degree to which each of the device-specific feature 202, the geographic feature 204, and the application-level feature 206 had a positive or negative impact on the disruption prediction 210. Similarly, the delight contribution levels 216 indicate the degree to which each of the device-specific feature 202, the geographic feature 204, and the application-level feature 206 had a positive or negative impact on the delight prediction 212.

In some implementations, the user experience prediction system 102 utilizes the disruption prediction 210, the delight prediction 212, the disruption contribution levels 214, and the delight contribution levels 216 to generate an attribution report 218. In one or more implementations, the attribution report 218 explains characteristics of the features that had the largest impacts on the disruption prediction 210 and on the delight prediction 212, respectively. To illustrate, in some examples, the user experience prediction system 102 generates the attribution report 218 including a ranked listing of the features that contributed most heavily to the disruption prediction 210. Additionally, the user experience prediction system 102 generates the attribution report 218 including a ranked listing of the features that contributed most heavily to the delight prediction 212. Furthermore, in some implementations, the user experience prediction system 102 generates the attribution report 218 including ranked listings of the characteristics represented by each of the highest contributing factors under each class (e.g., disruption or delight). As such, the attribution report 218 explains the predicted disruptions and/or delights that occurred during the session associated with the device-specific feature 202, the geographic feature 204, and the application-level feature 206 and makes the root cause of those disruptions and/or delights clear.

As mentioned above, FIG. 3 is a flow diagram of an exemplary computer-implemented method 300 for predicting session-level disruptions and delights as well as root causes for both. The steps shown in FIG. 3 may be performed by any suitable computer-executable code and/or computing system, including the system(s) illustrated in FIG. 4. In one example, each of the steps shown in FIG. 3 may represent an algorithm whose structure includes and/or is represented by multiple sub-steps, examples of which will be provided in greater detail below.

As illustrated in FIG. 3, at step 302 the user experience prediction system 102 generates a device-specific feature, a geographic feature, and an application-level feature associated with a session between a client device and a digital content system. In some examples, the user experience prediction system 102 generates the device-specific feature by determining device characteristics of the client device and a digital content system account identifier associated with the client device, and generating the device-specific feature based on the device characteristics of the client device and the digital content system account identifier associated with the client device. Additionally, in some examples, the user experience prediction system 102 generates the geographic feature by determining geographic characteristics associated with the client device and geographic characteristics associated with the session between the client device and the digital content system, and generating the geographic feature based on the geographic characteristics associated with the client device and the geographic characteristics associated with the session between the client device and the digital content system. Moreover, in some examples, the user experience prediction system 102 generates the application-level feature by determining application characteristics associated with the digital content system application installed on the client device, and generating the application-level feature based on the application characteristics.

As further illustrated in FIG. 3, at step 304 the user experience prediction system 102 applies a multiclass prediction deep neural network (e.g., the multiclass prediction DNN 208) to the device-specific feature, the geographic feature, and the application-level feature to generate a disruption prediction for the session and a delight prediction for the session. In some examples, both the disruption prediction and the delight prediction are binary.

As further illustrated in FIG. 3, at step 306 the user experience prediction system 102 determines contribution levels of the device-specific feature, the geographic feature, and the application-level feature to the disruption prediction. In some examples, determining the contribution levels of the device-specific feature, the geographic feature, and the application-level feature to the disruption prediction includes determining positive contribution levels and negative contribution levels for the device-specific feature, the geographic feature, and the application-level feature relative to the disruption prediction for the session. In at least one example, a positive contribution level indicates that an associated feature contributed to a favorable disruption prediction, and a negative contribution level indicates that an associated feature contributed to an unfavorable disruption prediction.

As further illustrated in FIG. 3, at step 308 the user experience prediction system 102 determines contribution levels of the device-specific feature, the geographic feature, and the application-level feature to the delight prediction. In some examples, determining the contribution levels of the device-specific feature, the geographic feature, and the application-level feature to the delight prediction includes determining positive contribution levels and negative contribution levels for the device-specific feature, the geographic feature, and the application-level feature relative to the delight prediction for the session. In at least one example, a positive contribution level indicates that an associated feature contributed to a favorable delight prediction, and a negative contribution level indicates that an associated feature contributed to an unfavorable delight prediction.

Additionally, as further illustrated in FIG. 3, at step 310 the user experience prediction system 102 generates an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction. At least one example further includes tracking attribution reports specific to the user of the client device for a predetermined amount of time, and in response to determining a deviation in at least one of disruption predictions or delight predictions indicated by the attribution reports, automatically selecting one or more session features for a next session initiated between the client device and the digital content system.

As mentioned above, and as shown in FIG. 4, the user experience prediction system 102 performs various functions in connection with predicting session-level disruptions and delights and illuminating root causes of those predicted disruptions and delights. FIG. 4 is a block diagram 400 of the user experience prediction system 102 operating within the memory 106 of the server(s) 112 while performing these functions. As such, FIG. 4 provides additional detail with regard to these functions. For example, in one or more implementations as shown in FIG. 4, the user experience prediction system 102 includes a feature manager 402, a multiclass prediction DNN manager 404, and an attribution manager 406. As further shown in FIG. 4, the additional items 108 stores and maintains session data 408.

In certain implementations, the user experience prediction system 102 represents one or more software applications, modules, or programs that, when executed by a computing device, may cause the computing device to perform one or more tasks. For example, and as will be described in greater detail below, one or more of the feature manager 402, the multiclass prediction DNN manager 404, and the attribution manager 406 may represent software stored and configured to run on one or more computing devices, such as the server(s) 112. One or more of the feature manager 402, the multiclass prediction DNN manager 404, or the attribution manager 406 of the user experience prediction system 102 shown in FIG. 4 may also represent all or portions of one or more special purpose computers to perform one or more tasks.

As mentioned above, and as shown in FIG. 4, the user experience prediction system 102 includes the feature manager 402. In one or more implementations, the feature manager 402 collects data (e.g., such as the session data 408) associated with sessions. For example, as discussed above, the feature manager 402 identifies session information associated with client devices, digital content system applications installed on those client devices, and current and previous sessions that are occurring or have occurred on those client devices.

From all of this information, the feature manager 402 generates input features. For example, as discussed above, the feature manager 402 generates device-specific features, geographic features, and application-level features. As such, each of the device-specific features, geographic features, and application-level features may include characteristics that are associated with either disruptions (e.g., number of application crashes), delights (e.g., number of playbacks per session), or both.

In most implementations, the feature manager 402 generates these features at the session level-meaning that these features are relative to a single session between a client device and the digital content system 104. In some implementations, the feature manager 402 aggregates features for sessions associated with a particular client device and/or digital content system user. For example, in one implementation, the feature manager 402 generates an application-level feature that reflects information for a current session in addition to a number of previous sessions between a single client device and the digital content system 104.

As mentioned above, and as shown in FIG. 4, the user experience prediction system 102 includes the multiclass prediction DNN manager 404. In one or more implementations, the multiclass prediction DNN manager 404 generates the multiclass prediction deep neural network (e.g., the multiclass prediction DNN 208). For example, as discussed above, the multiclass prediction DNN manager 404 generates the multiclass prediction DNN including two or more binary classifiers that each generate binary predictions. In some implementations, as part of generating the multiclass prediction DNN, the multiclass prediction DNN manager 404 also trains the multiclass prediction DNN.

In most examples, the multiclass prediction DNN manager 404 trains the multiclass prediction DNN with training input features and ground truth outputs. To illustrate, the multiclass prediction DNN manager 404 applies the multiclass prediction DNN to the training input features and compares the output predictions of the multiclass prediction DNN to the corresponding ground truth outputs. The multiclass prediction DNN manager 404 then back-propagates the results of these comparisons back through the multiclass prediction DNN. The multiclass prediction DNN manager 404 repeats these training epochs until the comparisons converge. Once trained, the multiclass prediction DNN manager 404 applies the multiclass prediction DNN to new input features at run time. In some implementations, the multiclass prediction DNN manager 404 periodically retrains the multiclass prediction DNN to ensure accuracy of the generated disruption predictions and delight predictions.

In one or more implementations, the multiclass prediction DNN manager 404 further employs model explainability techniques in connection with the multiclass prediction DNN to determine contribution levels of the input features to the generated disruption predictions and delight predictions. In some examples, as discussed above, the multiclass prediction DNN manager 404 applies the SHAP methodology to determine SHAP values for each of the input features and/or characteristics represented by the input features. In most implementations, the SHAP values indicate whether and how a feature or characteristic contributed positively or negatively to a disruption prediction. In at least one implementation, the multiclass prediction DNN manager 404 determines that the features and/or characteristics with the most negative SHAP values relative to the disruption prediction (e.g., the disruption prediction 210) contributed most significantly to an unfavorable disruption prediction (e.g., a prediction that a disruption did occur). Similarly, the multiclass prediction DNN manager 404 determines that the features and/or characteristics with the most positive SHAP values relative to the delight prediction (e.g., the delight prediction 212) contributed most significantly to a favorable delight prediction (e.g., a prediction that a delight did occur). In additional implementations, the multiclass prediction DNN manager 404 utilizes other model explainability techniques beyond or in addition to the SHAP methodology.

As mentioned above, and as shown in FIG. 4, the user experience prediction system 102 includes the attribution manager 406. In one or more implementations, the attribution manager 406 generates an attribution report in response to the disruption prediction DNN predicting that a disruption occurred during a particular session. For example, in some implementations, the attribution manager 406 generates the attribution report including the most significant SHAP values determined by the multiclass prediction DNN manager 404.

In at least one implementation, the attribution manager 406 utilizes the attribution report to automatically select experience features for future sessions. To illustrate, in one example an attribution report indicates that a session between a particular client device and the digital content system 104 experienced a disruption because the associated digital content system account was configured with a picture quality that was too high for the client device's level of network connectivity-thereby leading to freezes and re-buffers during that session. In light of this, the attribution manager 406 automatically re-configures the picture quality associated with that digital content system account such that the next session between that client device and the digital content system 104 experiences fewer or no freezes or re-buffers.

In one or more implementations, the attribution manager 406 automatically takes action in response to determining that a deviation has occurred in disruption predictions and/or delight predictions relative to a digital content system account. For example, in at least one implementation, the attribution manager 406 tracks attribution reports specific to a particular user for a predetermined amount of time (e.g., every day for ten days). The attribution manager 406 further analyzes these reports to determine whether any changes have occurred in the user's disruption and delight prediction. In one example, the attribution manager 406 determines that a deviation has occurred when a change in the number of predicted disruptions and/or delights is greater than or equal to 66% of the aggregate value for the corresponding prediction.

In response to determining that a deviation has occurred, the attribution manager 406 automatically performs one or more actions. For example, in response to determining that a number of delight predictions has increased, the attribution manager 406 may automatically apply digital content system application features or settings from the latest session to a next or future session. In another example, in response to determining that a number of disruption predictions has increased, the attribution manager 406 may automatically re-configure various settings of the digital content system application in an effort to either decrease future disruption predictions or increase future delight predictions.

As shown in FIGS. 1 and 4, the server(s) 112 and the client devices 114a-114n include one or more physical processors, such as the physical processors 110 and 122a-122n, respectively. The physical processors 110 and 122a-122n generally represent any type or form of hardware-implemented processing unit capable of interpreting and/or executing computer-readable instructions. In one implementation, the physical processors 110 and 122a-122n access and/or modify one or more of the components of the user experience prediction system 102. Examples of physical processors include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Additionally as shown in FIGS. 1 and 4, the server(s) 112 and the client devices 114a-114n include memories 106 and 118a-118n, respectively. In one or more implementations, the memories 106 and 118a-118n generally represent any type or form of volatile or non-volatile storage device or medium capable of storing data and/or computer-readable instructions. In one example, the memories 106 and 118a-118n store, load, and/or maintain one or more of the components of the user experience prediction system 102. Examples of the memories 106 and 118a-118n include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 112 includes the additional items 108. On the server(s) 112, the additional items 108 include the session data 408. In one or more implementations, the session data 408 includes client device characteristic information, geographic characteristic information, application-level characteristic information, and so forth. As described above, the feature manager 402 accesses the session data 408 to generate input features for the multiclass prediction DNN.

In summary, the user experience prediction system 102 avoids the inefficiencies and waste generated by other analytical systems that rely on repetitive, brute force data analysis to quantify user experiences during digital content system sessions. As discussed above, the user experience prediction system 102 trains a multiclass prediction deep neural network to generate accurate disruption predictions and delight predictions based on input features representing device characteristics, geographic characteristics, and digital content system application characteristics. The user experience prediction system 102 also goes a step further by utilizing model explainability techniques to determine which of the characteristics represented by the input features contributed most significantly to both the disruption prediction and the delight prediction. In this way, the user experience prediction system 102 quickly and accurately determines not only whether a disruption and/or delight occurred during a session but also why the disruption and/or delight occurred.

EXAMPLE EMBODIMENTS

Example 1: A computer-implemented method for predicting a user's experience during a digital content system session and determining root causes of the user's experience. For example, the method may include generating a device-specific feature, a geographic feature, and an application-level feature associated with a session between a client device and a digital content system, applying a multiclass prediction deep neural network to the device-specific feature, the geographic feature, and the application-level feature to generate a disruption prediction for the session and a delight prediction for the session, determining contribution levels of the device-specific feature, the geographic feature, and the application-level feature to the disruption prediction, determining contribution levels of the device-specific feature, the geographic feature, and the application-level feature to the delight prediction, and generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

Example 2: The computer-implemented method of Example 1, further including generating the device-specific feature by determining device characteristics of the client device and a digital content system account identifier associated with the client device, and generating the device-specific feature based on the device characteristics of the client device and the digital content system account identifier associated with the client device.

Example 3: The computer-implemented method of any of Examples 1 and 2, further including generating the geographic feature by determining geographic characteristics associated with the client device and geographic characteristics associated with the session between the client device and the digital content system, and generating the geographic feature based on the geographic characteristics associated with the client device and the geographic characteristics associated with the session between the client device and the digital content system.

Example 4: The computer-implemented method of any of Examples 1-3, further including generating the application-level feature by determining application characteristics associated with a digital content system application installed on the client device, and generating the application-level feature based on the application characteristics.

Example 5: The computer-implemented method of any of Examples 1-4, wherein the disruption prediction is binary, and the delight prediction is binary.

Example 6: The computer-implemented method of any of Examples 1-5, wherein determining the contribution levels of the device-specific feature, the geographic feature, and the application-level feature to the disruption prediction includes determining positive contribution levels and negative contribution levels for the device-specific feature, the geographic feature, and the application-level feature relative to the disruption prediction for the session.

Example 7: The computer-implemented method of any of Examples 1-6, wherein a positive contribution level indicates that an associated feature contributed to a favorable disruption prediction, and a negative contribution level indicates that an associated feature contributed to an unfavorable disruption prediction.

Example 8: The computer-implemented method of any of Examples 1-7, wherein determining the contribution levels of the device-specific feature, the geographic feature, and the application-level feature to the delight prediction includes determining positive contribution levels and negative contribution levels for the device-specific feature, the geographic feature, and the application-level feature relative to the delight prediction for the session.

Example 9: The computer-implemented method of any of Examples 1-8, wherein a positive contribution level indicates that an associated feature contributed to a favorable delight prediction, and a negative contribution level indicates that an associated feature contributed to an unfavorable delight prediction.

Example 10: The computer-implemented method of any of Examples 1-9, further including tracking attribution reports specific to the user of the client device for a predetermined amount of time, and in response to determining a deviation in at least one of disruption predictions or delight predictions indicated by the attribution reports, automatically selecting one or more session features for a next session initiated between the client device and the digital content system.

In some examples, a system may include at least one processor and a physical memory including computer-executable instructions that, when executed by the at least one processor, cause the at least one processor to perform various acts. For example, the computer-executable instructions may cause the at least one processor to perform acts including generating a device-specific feature, a geographic feature, and an application-level feature associated with a session between a client device and a digital content system, applying a multiclass prediction deep neural network to the device-specific feature, the geographic feature, and the application-level feature to generate a disruption prediction for the session and a delight prediction for the session, determining contribution levels of the device-specific feature, the geographic feature, and the application-level feature to the disruption prediction, determining contribution levels of the device-specific feature, the geographic feature, and the application-level feature to the delight prediction, and generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

In some examples, a method may be encoded as non-transitory, computer-readable instructions on a computer-readable medium. In one example, the computer-readable instructions, when executed by at least one processor of a computing device, cause the computing device to generate a device-specific feature, a geographic feature, and an application-level feature associated with a session between a client device and a digital content system, apply a multiclass prediction deep neural network to the device-specific feature, the geographic feature, and the application-level feature to generate a disruption prediction for the session and a delight prediction for the session, determine contribution levels of the device-specific feature, the geographic feature, and the application-level feature to the disruption prediction, determine contribution levels of the device-specific feature, the geographic feature, and the application-level feature to the delight prediction, and generate an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:
   generating a device-specific feature, a geographic feature, and an application-level feature associated with a session between a client device and a digital content system;
   applying a multiclass prediction deep neural network to the device-specific feature, the geographic feature, and the application-level feature to generate a disruption prediction for the session and a delight prediction for the session;
   determining contribution levels of the device-specific feature, the geographic feature, and the application-level feature to the disruption prediction;
   determining contribution levels of the device-specific feature, the geographic feature, and the application-level feature to the delight prediction; and
   generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

2. The computer-implemented method of claim 1, further comprising generating the device-specific feature by:

determining device characteristics of the client device and a digital content system account identifier associated with the client device; and generating the device-specific feature based on the device characteristics of the client device and the digital content system account identifier associated with the client device.

3. The computer-implemented method of claim 1, further comprising generating the geographic feature by:

determining geographic characteristics associated with the client device and geographic characteristics associated with the session between the client device and the digital content system; and generating the geographic feature based on the geographic characteristics associated with the client device and the geographic characteristics associated with the session between the client device and the digital content system.

4. The computer-implemented method of claim 1, further comprising generating the application-level feature by:

determining application characteristics associated with a digital content system application installed on the client device; and generating the application-level feature based on the application characteristics.

5. The computer-implemented method of claim 1, wherein:

the disruption prediction is binary; and
the delight prediction is binary.

6. The computer-implemented method of claim 5, wherein determining the contribution levels of the device-specific feature, the geographic feature, and the application-level feature to the disruption prediction comprises determining positive contribution levels and negative contribution levels for the device-specific feature, the geographic feature, and the application-level feature relative to the disruption prediction for the session.

7. The computer-implemented method of claim 6, wherein:

a positive contribution level indicates that an associated feature contributed to a favorable disruption prediction; and a negative contribution level indicates that an associated feature contributed to an unfavorable disruption prediction.

8. The computer-implemented method of claim 5, wherein determining the contribution levels of the device-specific feature, the geographic feature, and the application-level feature to the delight prediction comprises determining positive contribution levels and negative contribution levels for the device-specific feature, the geographic feature, and the application-level feature relative to the delight prediction for the session.

9. The computer-implemented method of claim 8, wherein:

a positive contribution level indicates that an associated feature contributed to a favorable delight prediction; and a negative contribution level indicates that an associated feature contributed to an unfavorable delight prediction.

10. The computer-implemented method of claim 1, further comprising:

tracking attribution reports specific to the user of the client device for a predetermined amount of time; and
in response to determining a deviation in at least one of disruption predictions or delight predictions indicated by the attribution reports, automatically selecting one or more session features for a next session initiated between the client device and the digital content system.

11. A system comprising:

at least one physical processor; and physical memory comprising computer-executable instructions that, when executed by the at least one physical processor, cause the at least one physical processor to perform acts comprising:

generating a device-specific feature, a geographic feature, and an application-level feature associated with a session between a client device and a digital content system;

applying a multiclass prediction deep neural network to the device-specific feature, the geographic feature, and the application-level feature to generate a disruption prediction for the session and a delight prediction for the session;

determining contribution levels of the device-specific feature, the geographic feature, and the application-level feature to the disruption prediction;

determining contribution levels of the device-specific feature, the geographic feature, and the application-level feature to the delight prediction; and generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

12. The system of claim 11, further comprising computer-executable instructions that, when executed by the at least one physical processor, cause the at least one physical processor to generate the device-specific feature by:

determining device characteristics of the client device and a digital content system account identifier associated with the client device; and generating the device-specific feature based on the device characteristics of the client device and the digital content system account identifier associated with the client device.

13. The system of claim 11, further comprising computer-executable instructions that, when executed by the at least one physical processor, cause the at least one physical processor to generate the geographic feature by:

determining geographic characteristics associated with the client device and geographic characteristics associated with the session between the client device and the digital content system; and generating the geographic feature based on the geographic characteristics associated with the client device and the geographic characteristics associated with the session between the client device and the digital content system.

14. The system of claim 11, further comprising computer-executable instructions that, when executed by the at least one physical processor, cause the at least one physical processor to generate the application-level feature by:

determining application characteristics associated with a digital content system application installed on the client device; and generating the application-level feature based on the application characteristics.

15. The system of claim 11, wherein determining the contribution levels of the device-specific feature, the geographic feature, and the application-level feature to the disruption prediction comprises determining positive contribution levels and negative contribution levels for the device-specific feature, the geographic feature, and the application-level feature relative to the disruption prediction for the session.

16. The system of claim 15, wherein:
a positive contribution level indicates that an associated feature contributed to a favorable disruption prediction; and
a negative contribution level indicates that an associated feature contributed to an unfavorable disruption prediction.

17. The system of claim 11, wherein determining the contribution levels of the device-specific feature, the geographic feature, and the application-level feature to the delight prediction comprises determining positive contribution levels and negative contribution levels for the device-specific feature, the geographic feature, and the application-level feature relative to the delight prediction for the session.

18. The system of claim 17, wherein:
a positive contribution level indicates that an associated feature contributed to a favorable delight prediction; and
a negative contribution level indicates that an associated feature contributed to an unfavorable delight prediction.

19. The system of claim 11, further comprising:
tracking attribution reports specific to the user of the client device for a predetermined amount of time; and
in response to determining a deviation in at least one of disruption predictions or delight predictions indicated by the attribution reports, automatically selecting one or more session features for a next session initiated between the client device and the digital content system.

20. A non-transitory computer-readable medium comprising one or more computer-executable instructions that, when executed by at least one processor of a computing device, cause the computing device to:
generating a device-specific feature, a geographic feature, and an application-level feature associated with a session between a client device and a digital content system;
applying a multiclass prediction deep neural network to the device-specific feature, the geographic feature, and the application-level feature to generate a disruption prediction for the session and a delight prediction for the session;
determining contribution levels of the device-specific feature, the geographic feature, and the application-level feature to the disruption prediction;
determining contribution levels of the device-specific feature, the geographic feature, and the application-level feature to the delight prediction; and
generating an attribution report specific to a user of the client device based on the contribution levels of the device-specific feature, the geographic feature, and the application-level feature to the disruption prediction and the contribution levels of the device-specific feature, the geographic feature, and the application-level feature to the delight prediction.

* * * * *